March 19, 1940.   F. C. A. OTT   2,193,979
CUTTING MACHINE
Filed Aug. 24, 1938   3 Sheets-Sheet 1

INVENTOR
Frederick C. A. Ott
BY
Duell, Kane and Smoot
ATTORNEYS

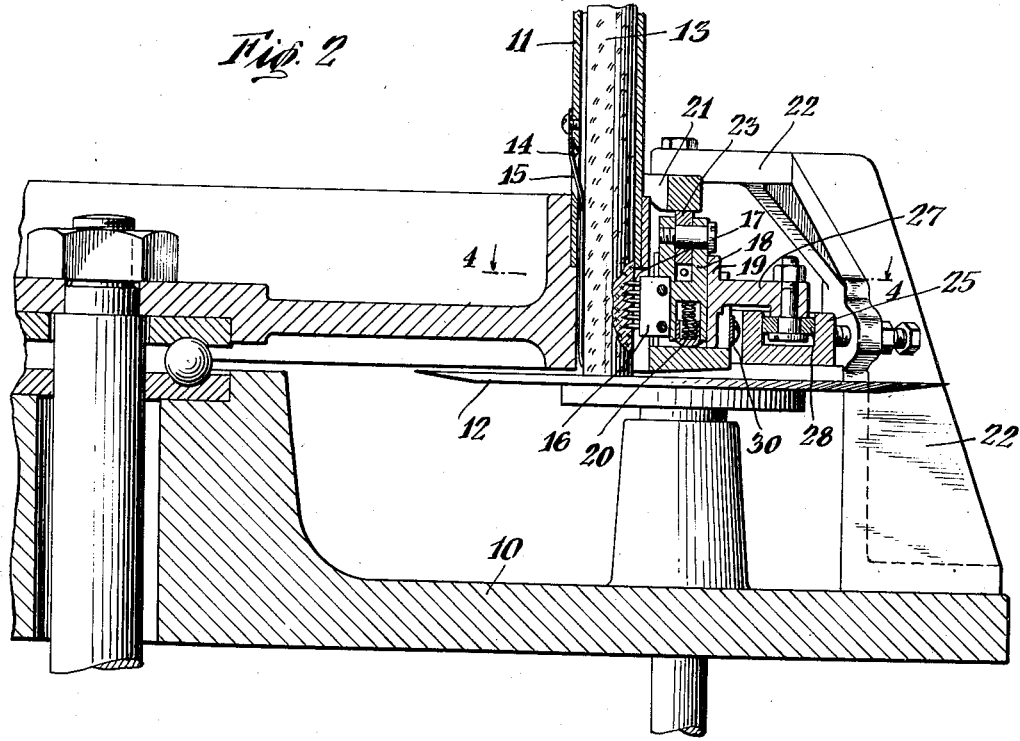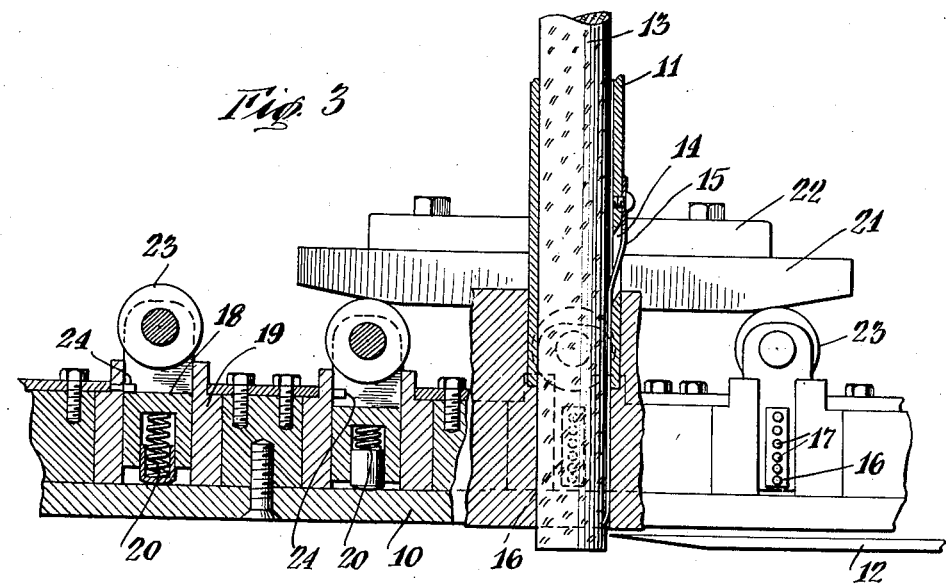

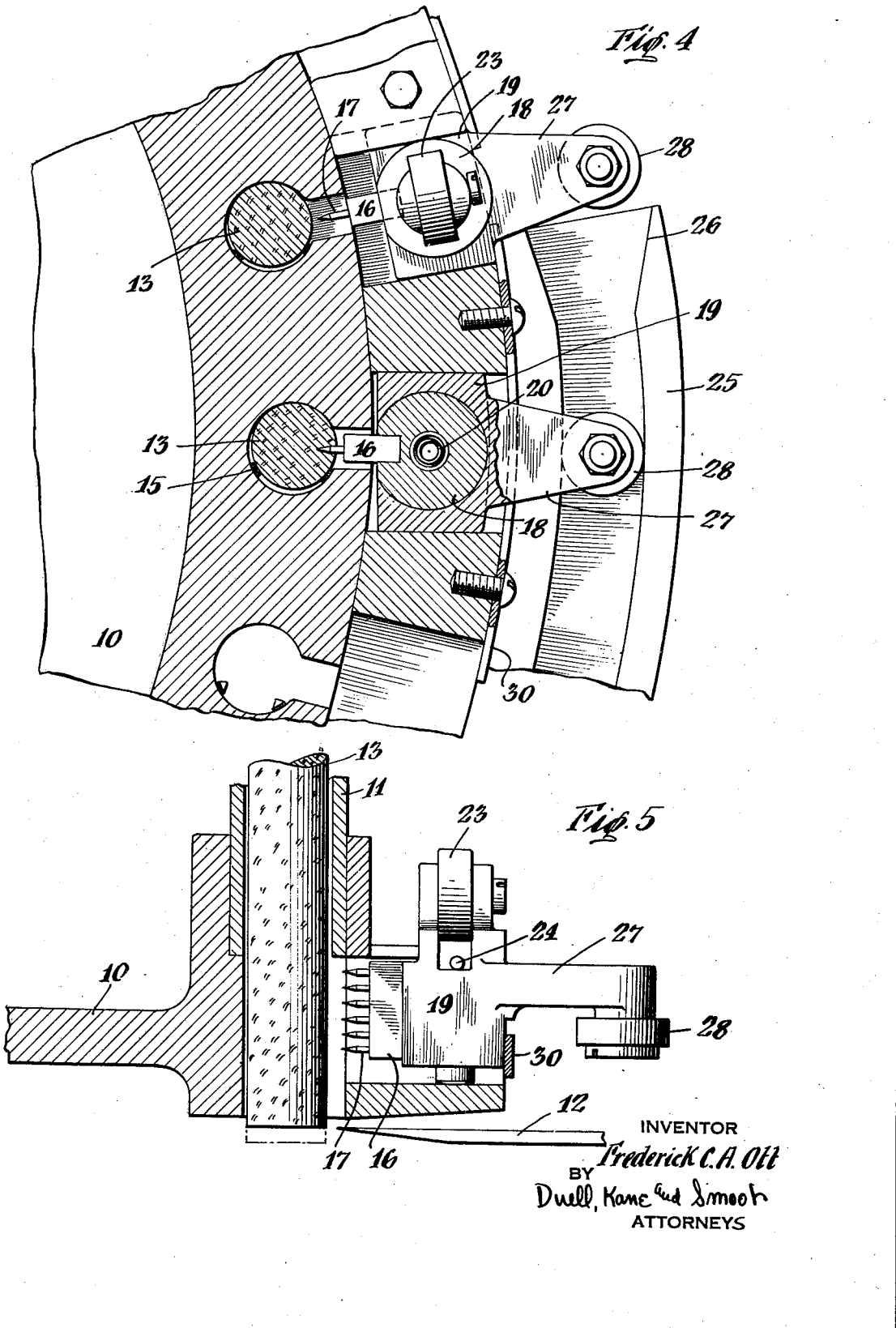

Patented Mar. 19, 1940

2,193,979

UNITED STATES PATENT OFFICE 2,193,979

CUTTING MACHINE

Frederick C. A. Ott, Glendale, N. Y., assignor to Mundet Cork Corporation, Brooklyn, N. Y., a corporation of New York Application August 24, 1938, Serial No. 226,466

4 Claims. (Cl. 144—21)

This invention relates to a structurally and functionally improved cutting machine.

It is an object of the invention to provide a mechanism of this character which will be of primary utility when employed to sever disks or lengths of rods of cork or similar material, to furnish elements which may be employed for example in association with closures of the crown and other types.

It is a further object of the invention to furnish a mechanism of this character in which the operations will be of an extremely positive nature so that a uniformly perfect product will result; the machine requiring a minimum of manual supervision.

Another object is that of furnishing a cutting machine which will embody relatively few parts each individually rugged and simple in construction, these parts operating over long periods of time with freedom from all difficulties.

Still another object of this invention is that of providing a machine in which such parts as may require replacement may readily be removed and renewed so that the operation of the machine will have to be interrupted for only minimum periods of time.

With these and other objects in mind reference is had to the attached sheets of drawings illustrating one practical embodiment of the invention and in which:

Fig. 2 is a transverse sectional view taken along the line 2—2 and in the direction of the arrows as indicated in Fig. 1;

Fig. 3 is a sectional side view taken along varying planes as indicated by the line 3—3 and in the direction of the arrows as indicated in Fig. 1;

Fig. 4 is a sectional plan view taken along the line 4—4 and in the direction of the arrows in Fig. 2;

Fig. 5 is a fragmentary transverse sectional view through the lower portion of one of the guide tubes.

Figure 1:
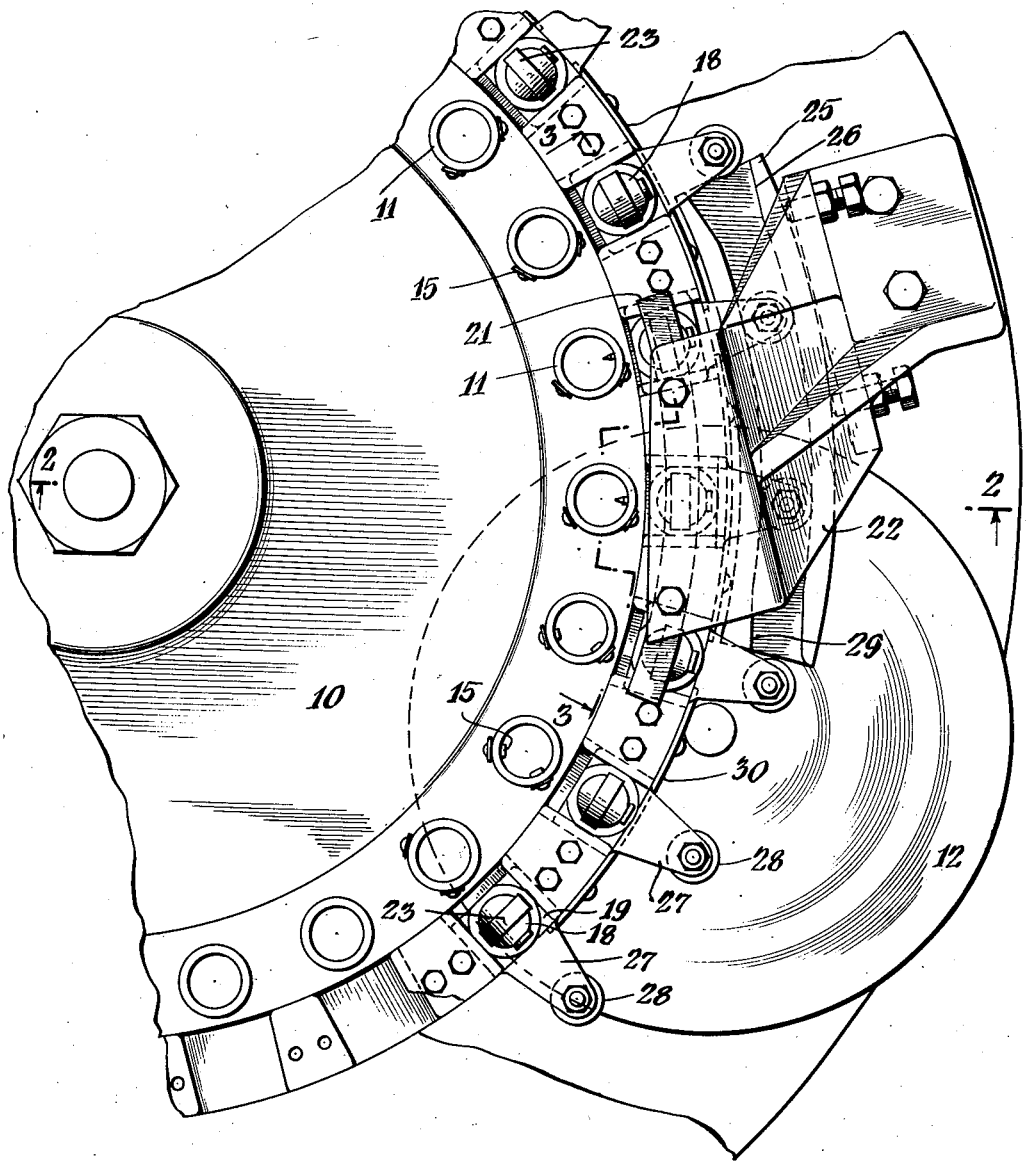
Fig. 1 is a fragmentary plan view of a machine.

With a view toward avoiding unnecessary illustration only a portion of the present machine has been illustrated. Also, there has been omitted from the present illustration any showing of the mechanism by means of which, for example, the finished articles are removed from the machine, or the raw material is fed thereto. Suffice it to say that the unillustrated portions of the mechanism are merely duplicates of those units which have been shown in detail and the structures employed to feed and remove the material may follow any one of a number of different but well known procedures.

Thus, referring to Fig. 1, the numeral 10 indicates the drum or turn table of the machine which may be of any suitable diameter and support tubes 11. This turn table is driven by any proper type of mechanism and situated adjacent the same is a severing mechanism which may take the form of a disk knife 12 rotated at any desired speed by means of a suitable drive (not shown). At this time it will be understood that the drum may be of any desired size and the tubes may be of any desired number and arranged in the form of a circle (as shown) or in the form of concentric circles. Additionally, any desired number of severing mechanisms may be employed. The illustration has not embraced these features, with a view to avoiding undue complication and unnecessary illustration of arrangements of mechanisms which will be obvious to those skilled in the art.

As is well known in machines of this type, it is customary for an operator to insert rods 13 of cork or similar material, one within each of the tubes 11. These rods are severed into a plurality of disks which may be associated for example one with each of a crown type closure element. By means of the present machine, however, a uniform product results and the disks are produced at a high rate of speed.

With a view to maintaining the rods 13 in proper positon within the tubes, it is preferred that the latter be formed with openings 14 through which extend the bodies of flat springs 15, the outer ends of which are secured against movement with respect to the tubes. These springs frictionally engage the rods 13 and prevent longitudinal displacement and play of the latter within the tubes, excepting only when such rods are deliberately manipulated.

With a view to securing such deliberate manipulation blocks 16 are disposed adjacent the lower ends of the tubes and in line with slots formed in the latter. Each of these blocks carries a series of impaling pins 17 capable of being extended to engage the surface of the rod. Each of these blocks is removably secured in any desired manner to an actuating member 18. It is obvious that according to the connection furnished at this point it will be a relatively easy matter to remove the blocks 16 as such removal may be necessary, and that the machine will only have to be momentarily interrupted to effect this adjustment.

Each of the actuating members 18 is mounted for vertical movement within guide members 19.

To this end the latter may be formed with bores to slidably receive the members 18. The guide members 19 move in horizontal directions and along lines radial to the center of the turn table or drum. To this end the latter and its associated structure furnishes guide-ways extending in the proper direction and to accommodate the members 19.

Actuating members 18 may be depressed for example by cam structure and raised by springs 20. The cam structure conveniently takes the form of a cam 21 supported above the turn table by for example a bracket 22. Rollers 23 are secured one to each of the actuating members at points above the body of the turn table and cam 21 extends in the path of these rollers as they are projected incident to the action of springs 20. It is thus obvious that as the turn table moves with respect to cam 21 the rollers will sequentially engage this cam and actuating members 18 will be retracted against the action of springs 20 to accordingly carry with them blocks 16. After the actuating members have moved beyond the cam the springs will of course project them to again elevate the blocks and impaling pins. In order to limit the upward movement of members 18 it is of course apparent that stop elements 24 may be carried by the turn table and engage the upper surfaces of the members when the latter have reached their properly elevated positions.

The guide members 19—as afore brought out—move in a horizontal plane and to effect this movement bracket 22 may have secured to it a trackway 25 formed with a flaring mount 26. Each of the guide members 19 is provided with a bracket 27 carrying a roller 28 for cooperation with the trackway. The rear portion of the latter presents surfaces as at 29 such that as the rollers emerge from it the guide members are fully projected, i. e., moved outwardly a maximum distance from the centers of the turn table or drum. In this connection it will of course be understood that strap members 30 may be associated with the turn table of the machine to limit the outward movement of members 19 in one direction.

Now, assuming that the tubes are filled with rods of cork or similar material, that the turn table is caused to rotate with respect to bracket 22 and that the knife 12 or any equivalent mechanism which is furnished, it will be appreciated that in the first instance, the rods are properly supported against displacement within the tubes. Additionally, as the tubes reach a point adjacent the severing mechanism it will be understood that the roller 28 will enter trackway 25 to cause inward movement of the members 19 and consequent penetration of the pins 17 into the body of the rod. Thereupon and incident to the cam structure provided by cam 21 and rollers 23, the carrying members 18 will be sequentially depressed. Incident to the continued movement of the turn table the projecting portion of the rod 13 will be severed by the knife and thereupon distributed as desired. Consequently and due to the guiding structure provided at 29 the impaling pins will be withdrawn from contact with the rod, and finally incident to the springs 20 the blocks carrying the pins will be elevated so that the entire cycle of operation may be repeated.

It is apparent that in this manner the thickness of the severed disks may be controlled with nicety and that the product will at all times be uniform. Additionally due to the simplicity of the mechanism it will operate with substantial freedom from manual supervision. Moreover, when adjustment or replacement is necessary, this may be effected with the expenditure of minimum effort and time.

Thus, it will be obvious that among others the several objects of the invention as specifically afore noted are achieved. Obviously numerous changes in construction and re-arrangements of the parts may be resorted to without departing from the spirit of the invention as defined by the claims.

Having described my invention, what I claim as new and desire to secure by Letters Patent is:

1. A cork cutting machine including in combination a frame, a turntable horizontally disposed for rotation thereon, a rod receiving tubes associated with said turntable at the periphery thereof and extending upwardly from the upper surface of said turntable, said turntable being formed with registering apertures beneath the lower ends of said rod receiving tubes to form a continuous passageway through said tubes and turntable to the under surface of the latter, impaling pins also mounted on said turntable and adjacent each of the rod receiving tubes, said impaling pins being capable of vertical and horizontal shifting, said rod receiving tubes having pin accommodating apertures through which said impaling pins can be projected to engage a rod of material within said tubes, a severing disk also carried by said frame and cooperating with the under surface of said turntable to sever the projecting portion of rods positioned within said rod receiving tubes and extending below the under surface of said turntable, and a cam track positioned beyond said rotating turntable for successively engaging the free end of said impaling pin members as said turntable is rotated whereby said impaling pins are successively projected inwardly through the apertures in said rod receiving tubes and thereby hold rods of material within said tubes when the same come in contact with said severing disk.

2. A cork cutting machine including in combination a frame, a turntable horizontally disposed for rotation thereon, rod receiving tubes associated with said turntable at the periphery thereof and extending upwardly from the upper surface of said turntable, said turntable being formed with registering apertures beneath the lower ends of said rod receiving tubes to form a continuous passageway through said tubes and turntable to the under surface of the latter, impaling pins also mounted on said turntable and adjacent each of the rod receiving tubes, said impaling pins being capable of vertical and horizontal shifting, said rod receiving tubes having pin accommodating apertures through which said impaling pins can be projected to engage a rod of material within said tubes, a severing disk also carried by said frame and cooperating with the under surface of said turntable to sever the projecting portion of rods positioned within said rod receiving tubes and extending below the under surface of said turntable, a cam track positioned beyond said rotating turntable for successively engaging the free end of said impaling pin members as said turntable is rotated whereby said impaling pins are successively projected inwardly through the apertures in said rod receiving tubes and thereby hold rods of material within said tubes when the same come in contact with said severing disk, and further cam means positioned above said first named cam means and engaging the upper surface of said impaling pins as the latter are rotated with said turntable whereby said impaling pins are successively moved downwardly to carry rods of material within said rod receiving tubes in a downward direction as the same approach said severing disk.

3. A cork cutting machine including in combination a frame, a turntable horizontally disposed for rotation thereon, rod receiving tubes associated with said turntable at the periphery thereof and extending upwardly from the upper surface of said turntable, said turntable being formed with registering apertures beneath the lower ends of said rod receiving tubes to form a continuous passageway through said tubes and turntable to the under surface of the latter, impaling pins also mounted on said turntable and adjacent each of the rod receiving tubes, said impaling pins being capable of vertical and horizontal shifting, said rod receiving tubes having pin accommodating apertures through which said impaling pins can be projected to engage a rod of material within said tubes, a severing disk also carried by said frame and cooperating with the under surface of said turntable to sever the projecting portion of rods positioned within said rod receiving tubes and extending below the under surface of said turntable, a cam track positioned beyond said rotating turntable for successively engaging the free end of said impaling pin members as said turntable is rotated whereby said impaling pins are successively projected inwardly through the apertures in said rod receiving tubes and thereby hold rods of material within said tubes when the same come in contact with said severing disk, further cam means positioned above said first named cam means and engaging the upper surface of said impaling pins as the latter are rotated with said turntable whereby said impaling pins are successively moved downwardly to carry rods of material within said rod receiving tubes in a downward direction as the same approach said severing disk, and spring means for retracting said impaling pins from said rod of material after the severing disk has been passed to a point outside said rod receiving tubes so that the movement of said vertically extending rods of material is not interfered with.

4. A cork cutting machine including in combination a frame, a turntable horizontally disposed for rotation thereon, rod receiving tubes associated with said turntable at the periphery thereof and extending upwardly from the upper surface of said turntable, said turntable being formed with registering apertures beneath the lower ends of said rod receiving tubes to form a continuous passageway through said tubes and turntable to the under surface of the latter, impaling pins also mounted on said turntable and adjacent each of the rod receiving tubes, said impaling pins being capable of vertical and horizontal shifting, said rod receiving tubes having pin accommodating apertures through which said impaling pins can be projected to engage a rod of material within said tubes, a severing disk also carried by said frame and cooperating with the under surface of said turntable to sever the projecting portion of rods positioned within said rod receiving tubes and extending below the under surface of said turntable, a cam track positioned beyond said rotating turntable for successively engaging the free end of said impaling pin members as said turntable is rotated whereby said impaling pins are successively projected inwardly through the apertures in said rod receiving tubes and thereby hold rods of material within said tubes when the same come in contact with said severing disk, further cam means positioned above said first named cam means and engaging the upper surface of said impaling pins as the latter are rotated with said turntable whereby said impaling pins are successively moved downwardly to carry rods of material within said rod receiving tubes in a downward direction as the same approach said severing disk, and spring controlled means for moving said impaling pins upwardly to their rest position after said severing disk has been passed.

FREDERICK C. A. OTT.